J. D. GE BOTT.
TOOTH BENDER.
APPLICATION FILED DEC. 24, 1907.
919,153.
Patented Apr. 20, 1909.
2 SHEETS—SHEET 1.
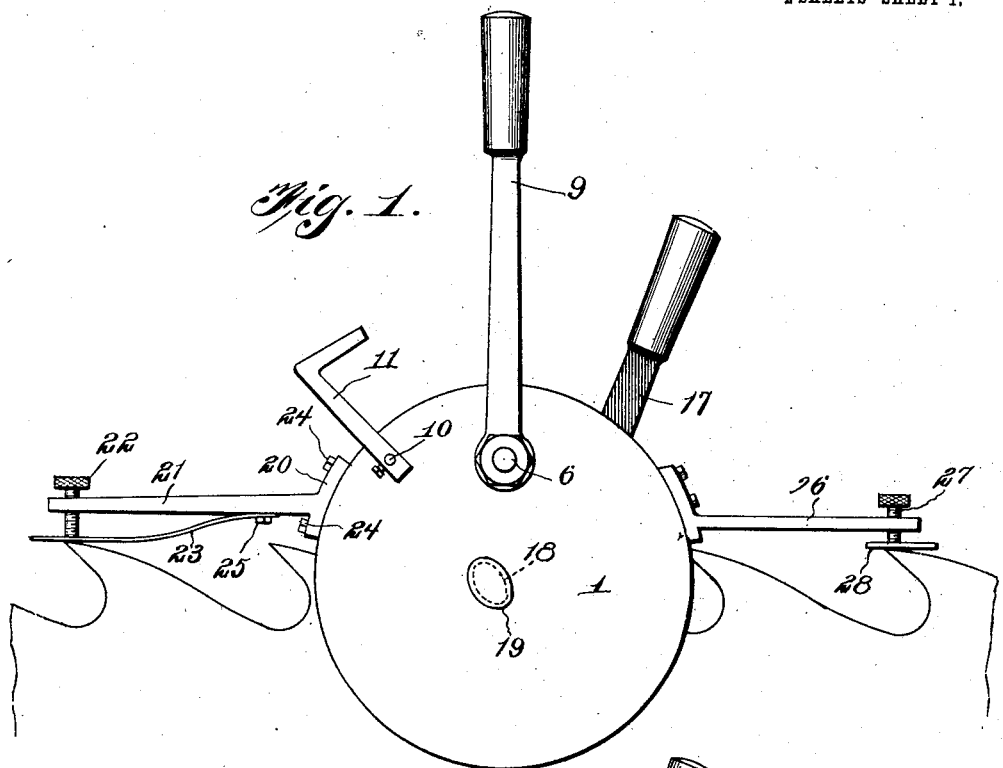
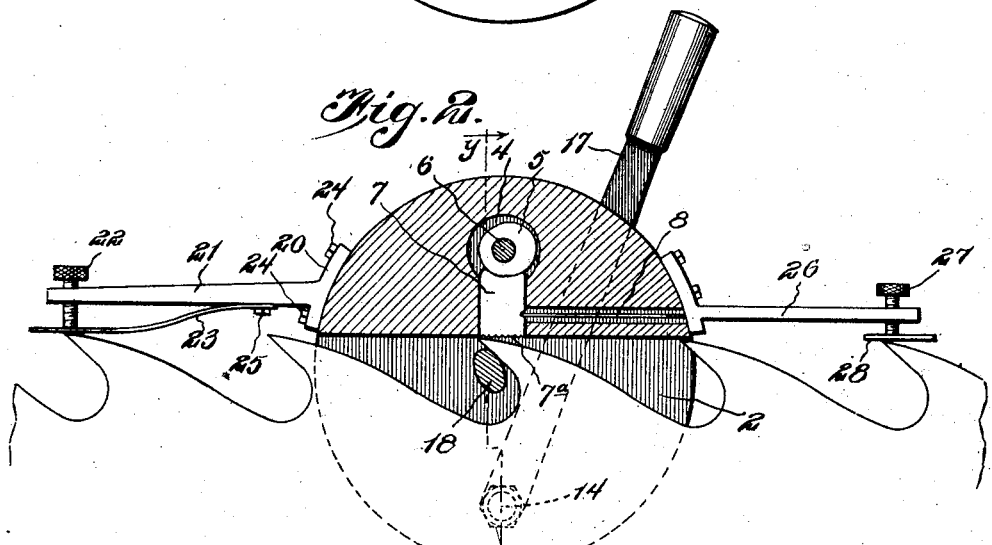
Witnesses
Inventor
Jay Dell GeBott
By
Attorneys

J. D. GE BOTT.
TOOTH BENDER.
APPLICATION FILED DEC. 24, 1907.

919,153.

Patented Apr. 20, 1909.
2 SHEETS—SHEET 2.

Witnesses
Louis R. Heinrichs
C. H. Griesbauer

Inventor
Jay Dell GeBott
By H. B. Willson & Co
Attorneys

UNITED STATES PATENT OFFICE.

JAY DELL GE BOTT, OF FOSTORIA, TEXAS.

TOOTH-BENDER.

No. 919,153.　　　Specification of Letters Patent.　　　Patented April 20, 1909.

Application filed December 24, 1907. Serial No. 407,927.

*To all whom it may concern:*

Be it known that I, JAY DELL GE BOTT, a citizen of the United States, residing at Fostoria, in the county of Montgomery and State of Texas, have invented certain new and useful Improvements in Tooth-Benders; and I do declare the following to be a full, clear, and exact description of the invention, such as will enable others skilled in the art to which it appertains to make and use the same.

My invention relates to tooth benders, and especially to that type used in connection with the bending of band saw teeth forward.

The object of the invention is to provide a device which will keep the teeth in proper shape and form and will place them in condition to be sent to the filing room for grinding.

A further object of the invention is to produce a device of this character which embodies means for properly forming the tooth, and with further means for limiting the shape of tooth so that an improperly-shaped tooth is an impossibility.

A further object of the invention is the provision of novel means for securing the device upon a band saw, and for retracting the bending plunger.

With these and other objects in view, the invention consists of certain novel features of construction, combination and arrangement of parts as will be described hereinafter and particularly pointed out in the appended claims.

Figure 3:
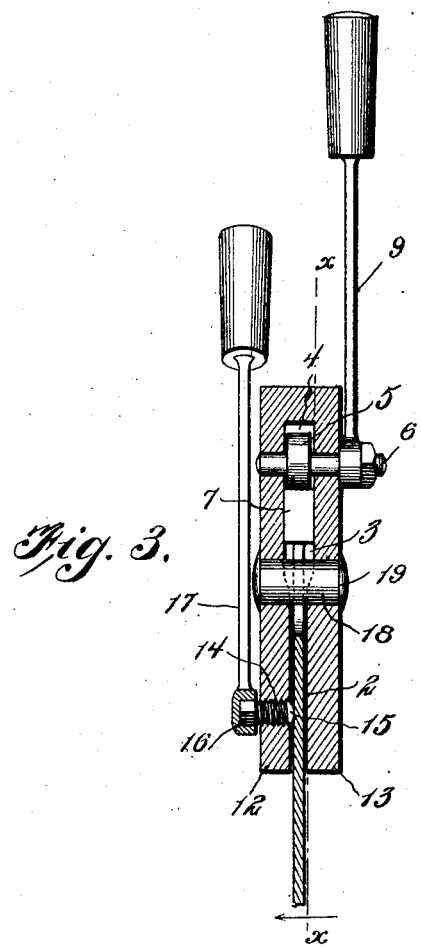
Figure 4:
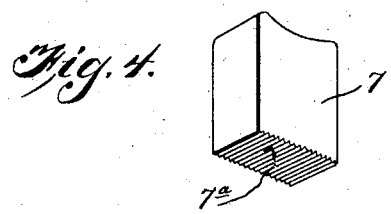

In the accompanying drawing, Figure 1 is a side elevation; Fig. 2 is a vertical longitudinal sectional view on the line $x$—$x$ of Fig. 3; Fig. 3 is a transverse central sectional view on the line $y$—$y$ of Fig. 2; and Fig. 4 is a detail view of the bending plunger.

Referring more especially to the drawings, 1 represents a heavy steel block, preferably cylindrical in outline, and which is cut away at 2, to provide a saw-receiving channel which is enlarged at its upper end to provide a recess, 3, for the widened edges of the saw teeth. Projecting above the channel, 2, is a vertical recess, 4, in which is mounted the plunger cam, 5, keyed upon the transverse shaft, 6, and the reciprocally mounted plunger, 7, having a serrated operating face, 7ª. This plunger is normally held in engagement with the cam by a leaf spring, 8, secured to the body, 1, in any suitable manner. Keyed to the shaft, 6, is an operating handle, 9, and adjustably mounted on a stub shaft, 10, is a limiting stop, 11, which is provided with a right-angular extension to engage the arm of the handle as it is moved forward to depress the plunger.

The channel, 2, is defined by a pair of legs, 12 and 13, in one of which is threaded a stub shaft, 14, having an engaging head, 15, located inside the channel, and a squared outer end, 16, to receive the clamping handle, 17. Passing through the legs and the channel is an eccentrically shaped anvil, 18, which is seated slightly out of line with the vertical alinement of the shaft, 6, and underneath the plunger, 7, adjacent one edge thereof. This anvil has its ends headed up as at 19 to provide a brace for the legs and to secure it from turning. To further secure it from turning, the apertures in the legs are made eccentric so as to correspond with the shape of the anvil.

Attached to one edge of the block is a slotted adjusting member, 20, which has projecting therefrom a gage arm, 21, having an adjusting screw, 22, at its outer end, which holds the gage plate or spring, 23, in adjusted position. The member 20 is secured upon the block 1 by set screws, 24, and the gage plate 23 is secured to the arm 21 by a set screw, 25. A similar gage-arm, 26, has its end let into the block 1 and its opposite gage end provided with an adjusting screw, 27, to which is secured an adjusting plate, 28.

It will be seen that I am enabled to adjust the device upon the band saw teeth as shown in Fig. 1 so as to obtain any desired shape to the teeth, and I am also enabled to limit the movement of the plunger by the limiting stop, 11. Thus two absolute controlling devices are provided which enable me to bend forward the entire lot of teeth on a band saw uniformly.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim as new, and desire to secure by Letters-Patent, is as follows:

1. In a device of the class described, a slotted body, a plunger operating vertically in said body to enter the slot therein, means for moving said plunger in one direction, and a spring extending through a horizontal channel in said body for returning said plunger to normal position.

2. In a device of the class described, a body having a saw blade receiving slot therein, a plunger working vertically in said body and having a notch therein, said plunger adapted to enter said slot, means for moving said plunger in one direction, a spring extending through a horizontal channel in said body to engage the notch in the plunger to return the plunger to normal position, and an anvil extending across the slot and adapted to hold a saw tooth in position to be engaged by the plunger.

In testimony whereof I have hereunto set my hand in presence of two subscribing witnesses.

JAY DELL GE BOTT.

Witnesses:
R. Q. TERRELL,
E. C. SMITH.